Patented Mar. 31, 1942

2,277,778

UNITED STATES PATENT OFFICE 2,277,778

PROCESS FOR PRODUCING SALTS

Merle Randall, Berkeley, Calif.

No Drawing. Application June 19, 1937,
Serial No. 149,095

7 Claims. (Cl. 23—50)

This invention relates to an improved process for the production of compounds not more than moderately soluble in a water miscible solvent by neutralizing or partly neutralizing an acidlike substance with a baselike substance in the presence of such solvent to produce a saltlike substance which is not more than moderately soluble in the resulting mixed solvent, and particularly to the manufacture of anhydrous alkaline sulfites by the neutralization of an alcoholic solution of caustic alkali by sulfur dioxide in a water miscible medium.

With the exception of commercial potassium metabisulfite, $K_2S_2O_5$, anhydrous potassium sulfites are not readily available on the market, for the reason that the production of pure anhydrous sulfites is not economically feasible by methods now in use. The production of a pure anhydrous normal potassium sulfite and other pure sulfites is distinctly advantageous for many uses.

Certain sulfites cannot be commercially produced of sufficient purity by present day methods. As evidence of the difficulty in producing neutral sulfites by the methods now in use, the specifications of purchasers of "U. S. P." and "C. P." grades of neutral sulfites frequently allow for the presence of considerable sulfates.

The object of my invention is to provide a process by means of which certain salts, particularly anhydrous sulfites can be made available for commerce, and by means of which the salts are of higher quality than those produced by present methods.

Another object of my invention is to provide a process by means of which pure salts, and sulfites in particular, can be more economically produced than by the processes now available.

Another object of my invention is to provide a method of obtaining a compound from the reaction of two compounds which react to form water as an additional product of reaction in which the reaction is carried out in a substantially non-aqueous water miscible medium in which the reacting compounds are soluble and the desired compound is not more than moderately soluble.

Another object of my invention is to provide a process at set forth above which can be operated either as a "batch" process or as a "continuous" process.

Other and further objects of my invention will appear from the following specification, in which some examples of my invention are disclosed.

I have discovered that if a clear solution of substantially anhydrous caustic potash in strong alcohol, or a clear mixture of strong aqueous caustic potash with strong alcohol, or aqueous caustic potash is slowly added to a comparatively large volume of strong alcohol, into which pure sulfur dioxide is introduced at a rate sufficient to keep the caustic potash only in slight excess, a fine white prcipitate of anhydrous potassium sulfite is formed, and that such impurities as are normally present in commercial solid caustic potash or strong aqueous caustic potash solution are not precipitated with the anhydrous potassium sulfite. A pure product is obtained due to the fact that the reaction is carried out in the presence of a comparatively large volume of high-proof alcohol and this is an important feature of the invention. The reaction that takes place is as follows:

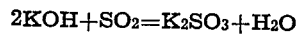

$$2KOH + SO_2 = K_2SO_3 + H_2O$$

Since water is formed in the production of anhydrous sulfites from caustic alkalis and sulfur dioxide, the concentration of the water in the solvent increases during the course of the reaction. The final concentration of the water is controlled by the proof of the alcohol, the water content of the caustic alkali and the concentration of the strong alkali solution, the ratio of the volume of solution added to the total volume of the final solution, and by the rate of removal of precipitate-free solution from, and addition of strong alcohol to the reaction chamber.

I prefer to use a strong solution of caustic potash because the solubility of other potassium salts, for example, potassium carbonate, potassium sulfate, etc., is greatly decreased by the common potassium ion from the caustic potash in the solution which is added to the volume of high-proof alcohol. On neutralization of this caustic potash, the concentration of the potassium ion is greatly decreased, resulting in a greater solubility of potassium carbonate, potassium sulfate, etc., in the resulting solution in the reaction chamber. The water formed in the neutralization of the caustic alkali increases the concentration of the water in the reaction chamber, and since the solubilities of the impurities brought with the alcoholic solution of caustic potash into the reaction chamber are increased with a higher water concentration, there is no precipitation of these impurities with the anhydrous alkali sulfite. If the solution in the reaction chamber is dilute with respect to total electrolytes, the amount of impurity adsorbed on the precipitated crystals is very small.

I use a solvent which is miscible with water so that the vapor pressure of the water of reaction is lowered by its dissolution in the solvent in order to produce an anhydrous salt, or a salt of a desired water content. I use a non-aqueous solvent in which the reacting compounds are soluble so that the desired salt will be precipitated free from solid reactants.

If the alkali is kept in slight excess in the reaction chamber, a neutral sulfite will be produced, while if the sulfur dioxide is kept in excess, a metabisulfite will be produced. The reaction in the production of the metabisulfite is as follows:

$$2KOH + 2SO_2 = K_2S_2O_5 + H_2O$$

In the production of anhydrous potassium sulfite by this method, I have found that the final concentration of water in the alcohol in the precipitating tank may vary between certain limits. All that is necessary is to maintain the partial pressure of water from the solution smaller than the vapor pressure of water from a mixture of the anhydrous salt with its next higher hydrate. This may be accomplished by removing a part of the solvent and replacing it with a solvent having a lower water content. In this manner the water content of the solution can be held within the desired limits. The terms "partial pressure" and "vapor pressure" are used rather than the more exact "fugacity," since the former are more commonly used and are sufficiently accurate for most purposes.

One form of my process applicable to the production of anhydrous potassium sulfite is as follows: Approximately 100 pounds of a good grade of commercial caustic potash are dissolved in approximately 75 gallons of ethyl alcohol of approximately 190 proof. This solution is then filtered and metered into a closed reaction chamber containing approximately 100 gallons of ethyl alcohol of approximately 190 proof. At the same time pure sulfur dioxide gas is metered into the closed reaction chamber at such a rate that the caustic potash is only in slight excess. As the concentration of the water in the mixture in the reaction chamber nears the upper limit for the production of anhydrous potassium sulfite at the temperature of the reaction chamber, which is the concentration at which the partial pressure of water is only slightly less than that of water from a mixture of anhydrous potassium sulfite and its lowest hydrate at the same temperature, namely that of the reaction chamber, the neutralization is carried to the end point, the precipitate settled, the supernatant solution removed for the recovery of alcohol, and the precipitate dried in a current of oxygen free gas or in vacuo. By the term "lowest hydrate" it is to be understood that I have reference to the hydrate of the compound having the lowest number of molecules of water of crystallization which the solid compound will carry. If desired, several precipitations can be made in the reaction chamber before the salt is dried. One means of accomplishing this result is to remove part of the solution from the reaction chamber, replace it with alcohol having a higher proof, and to continue adding alcoholic potash and sulfur dioxide gas to the solution in proper proportions as long as the water concentration in the mixture and the vapor pressure of water from the mixture are less than the respective upper limits for the production of anhydrous potassium sulfite at the given reaction temperature.

The potassium sulfite is removed from the reaction chamber through a salt trap (either continuously or in batches), washed in a closed centrifuge successively with alcohol of higher proof, the water concentration of the first alcoholic wash solution being at least less than that for the upper limit for the production of anhydrous potassium sulfite. The washings are returned to the reaction chamber or sent to the recovery system hereinafter mentioned. The heat of neutralization may be removed by radiation or conduction, or cooling pipes may be installed, or a heat exchanger may be used.

The product was analyzed and found to be of higher quality than any produced commercially by present methods.

The supernatant liquor remaining after an amount of sulfur dioxide chemically equivalent to the caustic potash has been added to the mixture was led into a side feed continuous alcohol rectifying still. It was found that the impurities remained in the mixture of alcohol and water in the lower part of the still, and were removed in a substantially alcohol free aqueous solution. The concentrated alcohol obtained at the top of the recovery column was found to be strong enough to be returned to the system either as solvent for the caustic potash, or for increasing the strength of the alcohol in the reaction chamber when the process is operated as a continuous one, or for washing the anhydrous salt.

If the reaction is carried out at the boiling point of the alcohol solution, the alcohol vapors from the reaction chamber may be led into the side of a continuous or batch concentrating column at the proper point, along with precipitate-free liquid from the reaction chamber, thus furnishing an economical source of a part of the heat for the reflux which must be used in such a recovery or rectifying column.

Various means of operating the process give convenient means for controlling the temperature, for the removal of water and impurities from the solvent, and for the recovery of such solvent. The reactants or the solutions of the reactants may be added to the reaction chamber at the same or different elevated or reduced temperatures and the reaction chamber may be at the same or a different temperature than that of the reactants. The reaction may be carried out at atmospheric, super-atmospheric, or reduced pressures.

My process is applicable, not only when ethyl alcohol is used as the principal solvent, but also when other alcohols, mixtures of alcohols, or other solvents miscible with water are used. For example, a mixture of ethyl alcohol with methyl alcohol, or acetone, or acetone and ethyl alcohol, alcohol and ether, or ether carrying less than the saturation amount of water, etc., may be used. In both the specification and claims I have used the word "alcohol" to include not only ethyl alcohol, but such other solvents or mixtures of solvents miscible with water as may be used, due account being taken that the vapor pressure of water from such a mixture, when saturated with the salt, must be less than the vapor pressure of water from a mixture of the salt with its next higher hydrate at the same temperature.

Other alcohol soluble alkalis or alcohol soluble base like substances may be used to form the corresponding sulfites. I have found that when alcoholic caustic soda is substituted for alcoholic caustic potash in my process, that an anhydrous sodium sulfite of superior quality is formed.

The concentration of sulfur dioxide may be kept in excess during the reaction and the process carried out to form anhydrous potassium metabisulfite, or anhydrous sodium metabisulfite depending upon the caustic alkali used.

In the production of anhydrous sodium metabisulfite and certain other salts, it is not commercially feasible to carry out the process until the concentration of the water in the mixture in the reaction chamber nears the upper limit for the production of the anhydrous salt, in that the salt becomes too soluble in the mixture to carry out the process in the most economical manner. In these instances, the process is carried out until the concentration of the water in the reaction chamber reaches that concentration in which the desired product becomes not more than moderately soluble.

In certain cases, even though the desired product is moderately soluble in the final mixture, it is both commercially feasible and desirable to carry out the process until the concentration of the water in the mixture in the reaction chamber nears the upper limit for the production of the desired compound.

However, in most cases, even though the concentration of the water in the mixture in the reaction chamber is less than that of the upper limit for the production of the desired compound, it is commercially advantageous to discontinue the process before the desired product becomes moderately soluble in said mixture, and in many cases, it is commercially advantageous to discontinue the process before the desired product becomes slightly soluble in the mixture in the reaction chamber.

One form of the process of my invention applicable to the production of anhydrous sodium metabisulfite is as follows:

$$2NaOH + 2SO_2 = Na_2S_2O_5 + H_2O$$

Approximately 100 pounds of a good grade of commercial caustic soda are dissolved in approximately 125 gallons of ethyl alcohol of approximately 190 proof. Pure sulfur dioxide gas is metered into a closed reaction chamber containing approximately 100 gallons of ethyl alcohol of approximately 190 proof. At the same time the alcoholic solution of caustic soda is filtered and metered into the closed reaction chamber at such a rate that the sulfur dioxide is always in excess. As the concentration of the water in the reaction chamber rises to that concentration in which the precipitated sodium metabisulfite is slightly soluble, the excess of sulfur dioxide is reduced, the precipitate settled, the supernatant solution is removed for recovery of the solvent, and the precipitated sodium metabisulfite dried in a current of oxygen free gas or in vacuo. If desired, more strong alcohol can be added to the reaction chamber and several precipitations can be made before the salt is dried, as in the manufacture of anhydrous potassium sulfite referred to above.

When an anhydrous salt having no hydrate, or a salt having no higher hydrate is being produced by the process of my invention then the concentration of the water in the alcohol must be kept so low that the vapor pressure of water from the alcohol solution is less than that from a saturated aqueous solution of the salt at the same temperature, due allowance being made for any changes which may occur in the concentration of the water in the alcohol solution during the step of drying the crystals.

By means of the process of my invention, other acidlike substances soluble in alcohol may be substituted for the sulfur dioxide, for example, hydrogen cyanide may be used with an alcoholic solution of caustic potash to form a superior quality of dry potassium cyanide.

One form of my invention applicable to the manufacture of finely crystalline potassium cyanide in accordance with the following reaction:

$$KOH + HCN = KCN + H_2O$$

is as follows:

Approximately 100 pounds of a good grade of commercial caustic potash are dissolved in approximately 75 gallons of ethyl alcohol of approximately 190 proof. This solution is then filtered and metered into a closed reaction chamber containing approximately 100 gallons of ethyl alcohol of approximately 190 proof. At the same time hydrogen cyanide gas is metered into the closed reaction chamber at such a rate that the caustic potash is only in slight excess. As the concentration of the water in the reaction chamber rises to that concentration in which the precipitated potassium cyanide is slightly soluble, the excess of caustic potash is reduced, the precipitate free solvent is removed and rectified, and the precipitate is dried substantially as previously described. A fine crystalline grade of dry potassium cyanide of high purity is obtained.

In another modification of the process of my invention an alcoholic solution of an acid or acidlike substance may be substituted for the sulfur dioxide gas with the formation of the corresponding salts, for example, an alcoholic solution of selenium dioxide and an alcoholic solution of caustic potash may be metered into a body of strong alcohol to form a superior quality of potassium selenite.

$$2KOH + SeO_2 = K_2SeO_3 + H_2O$$

In another form of my invention an alcoholic solution of caustic soda and an alcoholic solution of phosphorous acid may be added to a body of strong alcohol to form a superior quality of anhydrous monohydrogen sodium phosphite. The reaction is as follows:

$$2NaOH + H_3PO_3 = Na_2HPO_3 + 2H_2O$$

One form of the process of my invention applicable to the use of methyl alcohol as the nonaqueous water miscible solvent is as follows: Approximately 100 pounds of a good grade of commercial caustic potash are dissolved in approximately 100 gallons of methyl alcohol containing approximately 5 per cent of water. This solution is then filtered and metered into a closed reaction chamber containing approximately 100 gallons of methyl alcohol containing approximately 5 per cent of water. At the same time pure sulfur dioxide gas is metered into the reaction chamber at such a rate that the caustic potash is in only slight excess and the process is carried on substantially as described above for the manufacture of anhydrous potassium sulfite using ethyl alcohol of approximately 190 proof as the solvent. Many other modifications are possible using solvents or mixtures of solvents miscible with water in which the caustic potash is easily soluble, in which sulfur dioxide is appreciably soluble, in which anhydrous potassium sulfite is not more than moderately soluble, and in which it is stable with respect to its lowest hydrate.

In another modification of my invention, the solvent may be dehydrated beyond the constant boiling stage, and if necessary in order to provide a low enough vapor pressure of water, the circulating solvent may be withdrawn for dehydration while the concentration of the water in the reaction chamber is still below that of water in the constant boiling mixture.

In another modification of the process of my invention, it is adapted to the production of hydrated salts, for example, hydrated potassium sulfites. If the concentration of the water in the alcoholic solution in the reaction chamber is kept such that the vapor pressure of water from the alcoholic solution is between that of a mixture of the desired hydrate with its next lower hydrate, and the vapor pressure of a mixture of the desired hydrate with its next higher hydrate, the desired intermediate hydrate will be precipitated.

In one form of my process the baselike substance or solution of the baselike substance and stoichiometrically equivalent amounts of the acidlike substance or solution of the acidlike substance are separately and simultaneously led into a part of a reaction chamber containing strong alcohol and the two streams react to form a precipitate of the slightly soluble saltlike substance while moving to another part of the reaction chamber where a clear mixture of water and solvent is removed. The solvent removed is rectified to remove water and soluble impurities and returned to the system as solvent for the base or acidlike substances or to the reaction chamber. Meanwhile the precipitate is intermittently or continuously removed from another part of the reaction chamber.

While I prefer to wash the various products in order to remove any impurities which might be adsorbed on them, I have found that products of high quality are obtained by the use of the process of my invention, even though the washing operation is omitted.

While I prefer to add a solution of caustic alkali, or a solution or solutions of reactants to a body of solvent, the reactants may be run directly together without the presence of any solvent other than that in which the reactants are dissolved. After a volume of solvent is built up by the precipitation of the reactants, such a modification of my process is equivalent to the process which I have described above. Unless the solutions originally used in this modification are dilute, the quality of the product will be inferior during the early stages of the precipitation and the final concentration of water in the medium may be greater than that allowed by the properties of the precipitated salt.

By the term "water miscible medium" I mean that the medium is essentially non-aqueous but it may contain small amounts of water so long as these amounts do not make the vapor pressure of water from the resulting mixture with the reactants greater than that allowed by the nature of the desired salt product. Specifically, the term "water miscible medium" does not include aqueous solutions of electrolytes.

I have used the term "not more than moderately soluble" to mean that the solubility of the precipitated salt is not greater than that permitted by the profitable operation of the process, because dissolved salt removed with the solvent goes with the mother liquors from the solvent recovery step of the process, and is not available for the production of a first grade product without considerable further treatment.

By the term "solid compound of a definite state of hydration stable in contact with the medium," I mean that if the compound is anhydrous and possesses no higher hydrates, the vapor pressure of water from the mixture of the compound and the medium is slightly less than the vapor pressure of water from a mixture of the anhydrous compound and its saturated aqueous solution at the same temperature and pressure.

If the compound is an anhydrous compound possessing a higher hydrate, then it is stable in contact with the medium when the partial pressure of water from the medium is slightly less than the vapor pressure of water from the mixture of the anhydrous compound and its lowest hydrate at the same temperature and pressure.

A hydrated compound is stable in contact with the medium when the vapor pressure of water from the medium is greater than that from a mixture of the hydrated compound and its next lowest hydrate and is slightly lower than the vapor pressure of water from a mixture of the hydrated compound and its next highest hydrate (or its saturated solution if no higher hydrate exists) at the same temperature and pressure.

Although I have described my invention with respect to certain particular embodiments thereof, nevertheless, I do not desire to be limited to the particular details shown and described except as clearly specified in the appended claims, since many changes, modifications, and substitutions may be made without departing from my invention in its broader aspects, which may be found useful in many other applications thereof.

I claim:

1. The method of obtaining chemical compounds by a precipitation reaction which comprises separately and simultaneously adding relatively small amounts of a base and an acid in relatively concentrated form and in stoichiometric proportion to a relatively large body of a water miscible medium in which the reactants are soluble, said reaction products characterized by their high purity, their definite state of hydration, their high solubility in water, their ease of oxidation and their moderate solubility in the water miscible medium.

2. The method of obtaining chemical compounds by a precipitation reaction which comprises separately adding relatively small amounts of a base and an acid in relatively concentrated form to a relatively large body of a water miscible medium in which the reactants are soluble and in which the reaction products are not more than moderately soluble, said reactants added in such quantities whereby only a small excess of either reactant is present to maintain a low total concentration of electrolytes.

3. The method of obtaining chemical compounds by a precipitation reaction which comprises separately and simultaneously adding relatively small amounts of a base and an acid in relatively concentrated form and in stoichiometric proportion to a relatively large body of a water miscible medium in which the reactants are soluble and in which the reaction products are not more than moderately soluble, the water content of the medium being so controlled that compounds of a definite desired state of hydration are produced.

4. The method of obtaining chemical compounds by a precipitation reaction which comprises separately and simultaneously adding relatively small amounts of a base and an acid in relatively concentrated form and in stoichiometric proportion to a relatively large body of a water miscible medium in which the reactants are soluble and in which the reaction products are not more than moderately soluble, said reactants added in such quantities whereby the vapor pressure of water over the solution is maintained within such limits that the desired solid compound of a definite state of hydration is stable in contact with the water miscible medium.

5. The method of obtaining alkali sulfites by a precipitation reaction which comprises separately and simultaneously adding relatively small amounts of an alkali hydroxide and sulfur dioxide in relatively concentrated form and in stoichiometric proportion, to a relatively large body of a water miscible medium in which the alkali hydroxide and the sulfur dioxide are soluble and in which the alkali sulfite is not more than moderately soluble.

6. The method of obtaining alkali cyanides by a precipitation reaction which comprises separately and simultaneously adding relatively small amounts of an alkali hydroxide and hydrocyanic acid in relatively concentrated form and in stoichiometric proportion, to a relatively large body of a water miscible medium in which the alkali hydroxide and the hydrocyanic acid are soluble and in which the alkali cyanide is not more than moderately soluble.

7. The method of obtaining alkali phosphites by a precipitation reaction which comprises separately and simultaneously adding relatively small amounts of an alkali hydroxide and phosphorous acid in relatively concentrated form and in stoichiometric proportion, to a relatively large body of a water miscible medium in which the alkali hydroxide and the phosphorous acid are soluble in which the alkali phosphite is not more than moderately soluble.

MERLE RANDALL.